United States Patent
Bohn

(10) Patent No.: US 10,222,620 B2
(45) Date of Patent: Mar. 5, 2019

(54) PUPIL-EXPANSION OPTIC WITH OFFSET ENTRY APERTURES

(71) Applicant: Microsoft Technology Licensing, LLC, Redmond, WA (US)

(72) Inventor: David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 18 days.

(21) Appl. No.: 15/433,794

(22) Filed: Feb. 15, 2017

(65) Prior Publication Data

US 2018/0231779 A1    Aug. 16, 2018

(51) Int. Cl.
| | |
|---|---|
| *G02B 27/01* | (2006.01) |
| *F21V 8/00* | (2006.01) |
| *G02B 3/00* | (2006.01) |
| *G02B 27/00* | (2006.01) |
| *G02B 27/42* | (2006.01) |

(52) U.S. Cl.
CPC ..... *G02B 27/0172* (2013.01); *G02B 27/0081* (2013.01); *G02B 3/0006* (2013.01); *G02B 2027/0112* (2013.01); *G02B 2027/0125* (2013.01)

(58) Field of Classification Search
None
See application file for complete search history.

(56) References Cited

U.S. PATENT DOCUMENTS

| | | |
|---|---|---|
| 6,788,388 B2 | 9/2004 | Smith |
| 2002/0093521 A1 | 7/2002 | Daly et al. |
| 2003/0086624 A1 | 5/2003 | Garcia |
| 2004/0130762 A1 | 7/2004 | Thomas et al. |
| 2006/0078125 A1 | 4/2006 | Cacayorin |
| 2007/0177275 A1 | 8/2007 | McGuire, Jr. |
| 2009/0185153 A1 | 7/2009 | Epple |
| 2010/0141902 A1 | 6/2010 | Destain et al. |
| 2012/0113306 A1 | 5/2012 | Dai et al. |
| 2013/0250430 A1* | 9/2013 | Robbins ............. G02B 27/0172 359/633 |
| 2014/0104665 A1* | 4/2014 | Popovich ........... G02B 27/0081 359/15 |

(Continued)

FOREIGN PATENT DOCUMENTS

WO    2016118367 A1    7/2016

OTHER PUBLICATIONS

Mack, Chris A., "Off-Axis Illumination", In Journal of Microlithography World, vol. 12, Issue 3, Aug. 2003, 4 pages.

*Primary Examiner* — Ryan Crockett
(74) *Attorney, Agent, or Firm* — Alleman Hall Creasman & Tuttle LLP

(57) ABSTRACT

A near-eye display system comprises first and second optical waveguides. The first optical waveguide is configured to receive a first image through a first entry aperture, to expand the first image along the first optical waveguide, and to release an expanded first image. Layered parallel to the first optical waveguide, the second optical waveguide is configured to receive a second image through a second entry aperture, to expand the second image along the second optical waveguide, and to release an expanded second image to overlap the expanded first image. The second entry aperture is offset from the first entry aperture along the second optical waveguide.

20 Claims, 6 Drawing Sheets

(56) References Cited

U.S. PATENT DOCUMENTS

2014/0140653 A1* 5/2014 Brown ................. G02B 6/0033
                                                     385/10
2016/0085300 A1   3/2016 Robbins et al.
2018/0082644 A1*  3/2018 Bohn .................... G09G 3/346

* cited by examiner

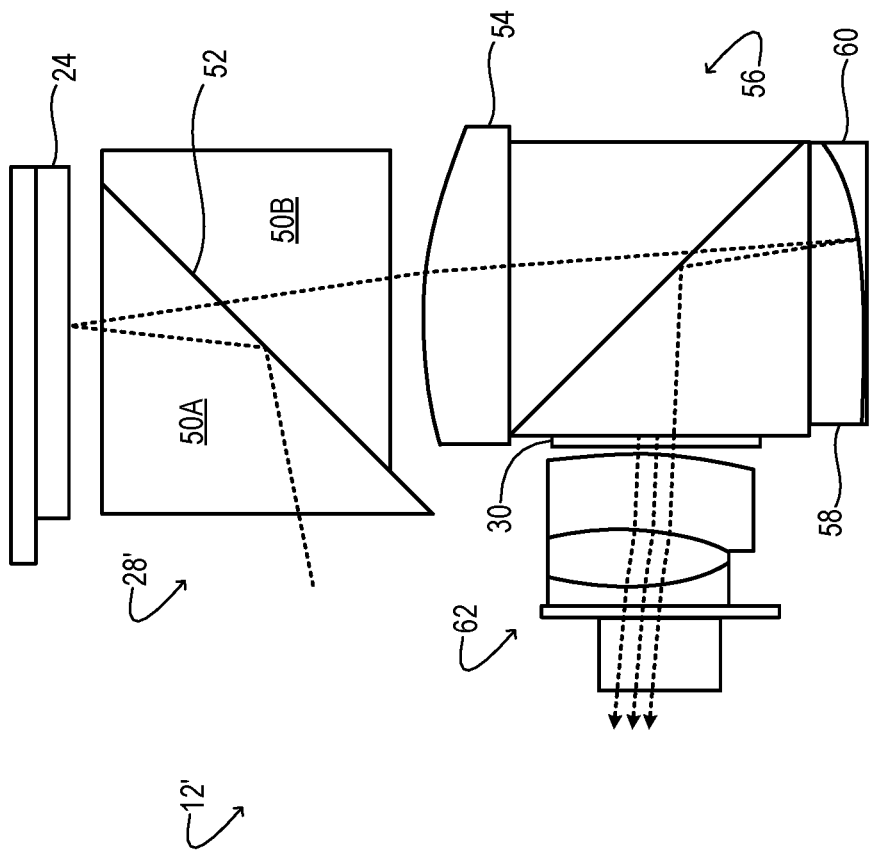
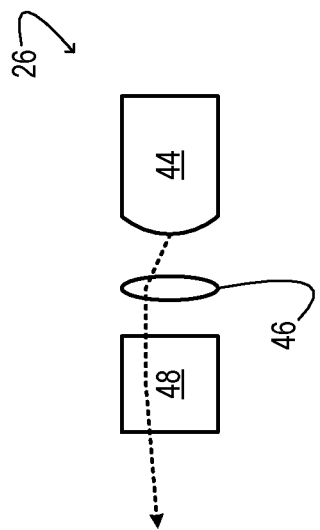
FIG. 6
FIG. 5

PUPIL-EXPANSION OPTIC WITH OFFSET ENTRY APERTURES

BACKGROUND

In recent years, near-eye display technology has transitioned from niche status into an emerging consumer technology. Implemented primarily in head-worn display devices, near-eye display technology enables 3D stereo vision and virtual reality (VR) presentation. When implemented with see-through optics, it enables a mixed reality, in which VR elements are admixed into the user's natural field of view. Despite these benefits, near-eye display technology faces numerous technical challenges not encountered in conventional display technology. These include the challenge of projecting right- and left-eye display images into a sufficiently wide eye box while preserving display image quality.

SUMMARY

One embodiment is directed to near-eye display system comprising first and second optical waveguides. The first optical waveguide is configured to receive a first image through a first entry aperture, to expand the first image along the first optical waveguide, and to release an expanded first image. Layered parallel to the first optical waveguide, the second optical waveguide is configured to receive a second image through a second entry aperture, to expand the second image along the second optical waveguide, and to release an expanded second image to overlap the expanded first image. To reduce cross-coupling of the first and second images, the second entry aperture is offset from the first entry aperture.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows aspects of an example light emitter of a near-eye display system.

FIG. 6 shows aspects of another example near-eye display system of a head-mounted display.

DETAILED DESCRIPTION

Figure 1:
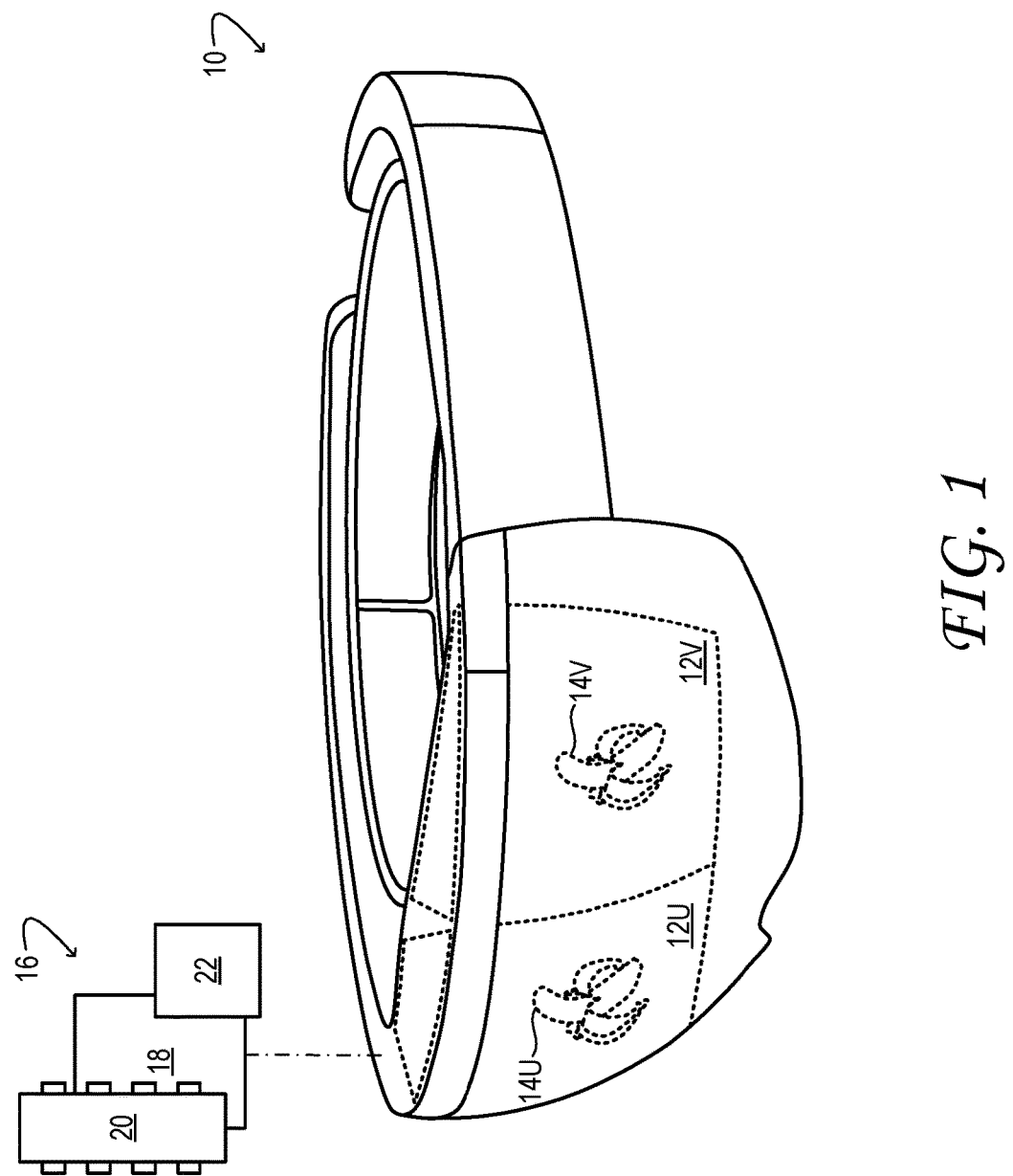
FIG. 1 shows aspects of an example head-mounted display.

Aspects of this disclosure will now be described by example and with reference to the drawing figures listed above. Components, process steps, and other elements that may be substantially the same in one or more of the figures are identified coordinately and are described with minimal repetition. It will be noted, however, that elements identified coordinately may also differ to some degree. Except where particularly noted, the figures are schematic and generally not drawn to scale. Rather, the various drawing scales, aspect ratios, and numbers of components shown in the drawings may be purposely distorted to make certain features or relationships easier to see.

FIG. 1 shows aspects of an example head-mounted display (HMD) device 10. The head-mounted display device includes a near-eye display system 12 positioned in front of each of the user's eyes—viz., a right-eye display system 12U and a left-eye display system 12V. The right-eye display system is configured to form a right-eye image 14U, and the left-eye display system is configured to form a left-eye image 14V. The near-eye display systems are operatively coupled to an on-board computer 16. The on-board computer includes at least one processor 18, associated computer memory 20, and a communications component 22 for receiving data from a network. In some embodiments, the processor renders the right- and left-eye display images. In some embodiments, the display images are rendered based on data received through the communications component.

Figure 2:
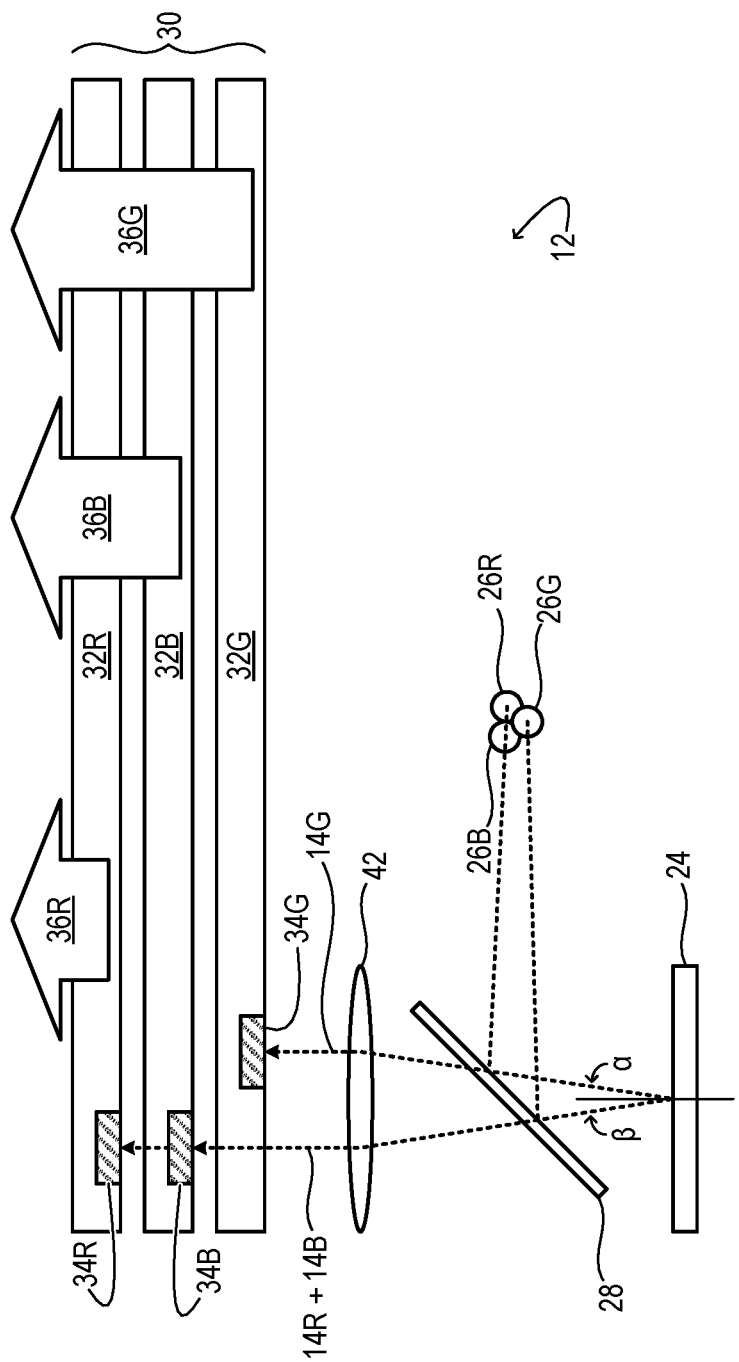
FIG. 2 shows aspects of an example near-eye display system of a head-mounted display.

FIG. 2 shows aspects of near-eye display system 12 in one example embodiment. To present a display image 14 to the right or left eye, the near-eye display system includes a reflective image-forming array 24 illuminated by a plurality of light emitters 26. The image-forming array may be a liquid-crystal-on-silicon (LCOS) array in some embodiments. An LCOS array is a regular, two-dimensional array of liquid-crystal elements. The elements share an optically transparent front electrode but are provided each with an individually addressable, reflective back electrode. Electrical bias applied to an element of the array changes the alignment of the liquid crystal therein, enabling that element to function as a polarizing filter to illumination reflecting from the back electrode. In this manner, light of a controlled polarization state emerges from each pixel element. The undesired polarization component is removed as it passes through a front polarizer common to all elements of the array. This action converts the encoded polarization-state of the light from each element into a corresponding reflected intensity from that element. A suitable array driver provides control data, which determines the level of bias of each element and thereby defines the image reflected from the array. In some embodiments, image-forming array 24 may take the form of a ferroelectric LCOS (FLCOS) array having decreased polarization-state switching latency, a digital micromirror device (DMD), or a holographic spatial light modulator (SLM), as examples.

Some display-systems include a plurality of reflective image-forming arrays-separate arrays for red, green, and blue component images. In these configurations, a composite color image is formed by downstream optical fusion of the component images. In the embodiment of FIG. 2, however, near-eye display system 12 includes only one image-forming array 24. This array is operated in multiplex-receiving, during a predetermined time slice, narrow-band red, green, or blue illumination, and concurrent control data defining the component image 14 corresponding to the color of the illumination received. The image-forming array forms each of the component images in rapid succession, with fusion of the component images taking place in the user's optical cortex.

Accordingly, first light emitter 26R of FIG. 2 may be a red emitter of a suitably narrow wavelength band. Second light emitter 26G may be a green emitter, and third light emitter 26B may be a blue emitter, all of suitably narrow wavelength bands. In the embodiment of FIG. 2, each emitter is fired in sequence, synchronized to receipt of the control data corresponding to the component image of the associated color. In some embodiments, each of the first, second, and third light emitters may include a laser or a light-emitting diode. The emission from each of the light emitters reaches image-forming array 24 via polarizing beamsplitter 28. The polarizing beamsplitter is configured to reflect S-polarized light from the light emitters and to transmit P-polarized light, formed by reflection from the array.

Images 14 as produced by image-forming array 24 are typically not suitable for direct viewing by the user of HMD device 10. Image-forming array 24 offers a very small exit pupil that would have to be aligned to within a millimeter of the user's anatomical pupil for proper viewing. Even then, the user may perceive vignetting of the sighted image under dark conditions, when the anatomical pupil could be larger than the exit pupil of the image-forming array. Accordingly, near-eye display system 12 includes a pupil expansion portion 30 configured to expand the component images from image-forming array 24 across an area in which the user's pupils are likely to be situated. The pupil expansion portion includes a stack of optical waveguides 32, each waveguide having an entry aperture 34 as well as an exit pupil (vide infra).

First waveguide 32R is configured to receive a first image 14R through first entry aperture 34R, to expand the first image along the length of the first waveguide, and to release an expanded first image 36R. Layered parallel to the first waveguide, second waveguide 32G is configured to receive a second image 14G through a second entry aperture 34G, to expand the second image along the length of the second waveguide, and to release an expanded second image 36G to overlap the expanded first image. Third waveguide 32B is layered parallel to the first and second waveguides. The third waveguide is configured to receive a third image 14B through third entry aperture 34B, to expand the third image along the length of the third waveguide, and to release an expanded third image 36B to overlap the expanded first and second images.

In the embodiment of FIG. 2, where light emitters 26R, 26G, and 26B emit different colors of light, first image 14R received by first waveguide 32R may be a component image of a first color (e.g., red). Second image 14G received by second waveguide 32G may be a component image of a second color (e.g., green), and third image 14B received by third waveguide 32B may be a component image of a third color (e.g., blue). Accordingly, component images corresponding to three different wavelength bands are expanded separately in the three different waveguides.

Due to the layered arrangement of waveguides 32 in near-eye display system 12, second waveguide 32G must transmit first image 14R and third image 14B to first waveguide 32R and to third waveguide 32B, respectively, in order for the first and third images to be received in their respective entry apertures. Likewise, third waveguide 32B must transmit the first image to the first waveguide. Moreover, expanded second image 36G must be transmitted by the first and third waveguides to the user's eye, and expanded third image 36B must be transmitted by the first waveguide. The illustrated stacking order of the first, second, and third waveguides in expansion portion 30 should not be construed as limiting in any way. Naturally, the various permutations in the stacking order would give rise to different requirements for transmission of the expanded and non-expanded component images.

Figure 3:
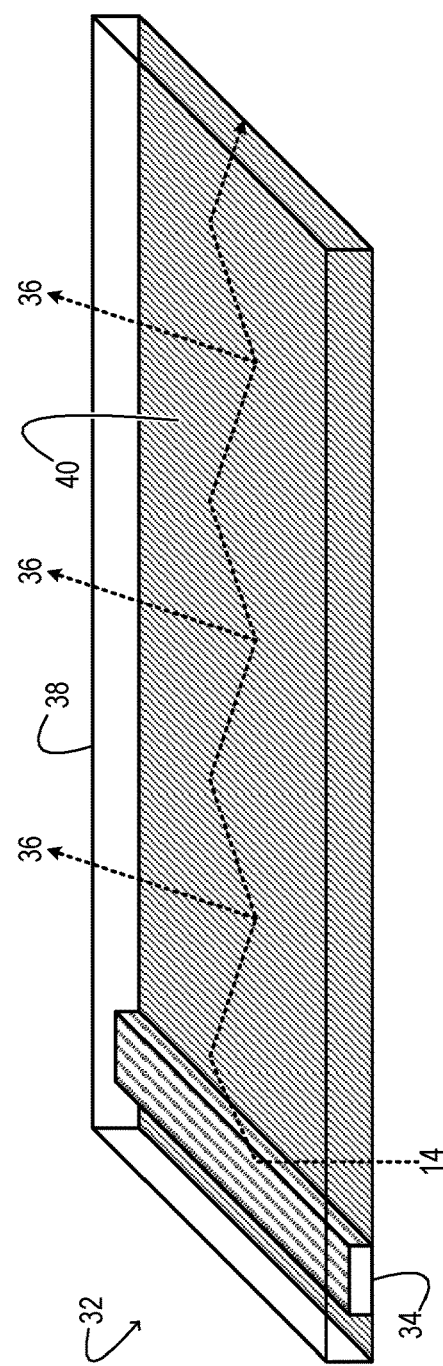
FIG. 3 shows aspects of an example optical waveguide of a near-eye display system.

FIG. 3 shows additional aspects of an example waveguide 32—e.g., first waveguide 32R, second waveguide 32G, or third waveguide 32B. Waveguide 32 is an optically transparent sheet a few microns in thickness; it may comprise acrylic or polycarbonate, for example. In the illustrated embodiment, entry aperture 34 takes the form of a surface-relief grating molded into the waveguide medium 38. A surface-relief grating includes a regular series of diffractive features (such as grooves or divots) configured to interact with light of a predetermined, narrow wavelength band and angle of incidence. The light that interacts with the surface-relief grating is deflected into the waveguide medium at a supercritical angle; it propagates down the length of the waveguide via total internal reflection (TIR). At every bounce, a portion of the propagating light may interact with exit pupil 40. The exit pupil may include a weak diffraction grating configured to deflect the interacting portion of the light into a subcritical angle, allowing escape from the waveguide. Typically, the grating strength of the exit pupil is adjusted upward with distance from the entry aperture to correct for loss of image intensity along the length of the waveguide. In this manner, a very narrow image 14 from image-forming array 24 may be expanded to fill an entire range of expected pupil positions. In some embodiments, an entry or exit pupil in the form of a volume hologram may be written into the waveguide medium. The volume hologram may be positioned and used in lieu of the surface-relief gratings described above. In still other embodiments, an entry or exit pupil in the form of a polarization Bragg grating may be used.

Ideally, light outside of the narrow wavelength band and acceptance cone of entry aperture 34 does not strongly interact with the entry aperture, but primarily passes directly through the associated waveguide 32. In some implementations, therefore, entry apertures of the waveguides that expand the component images of the different colors may be aligned along the length of the layered waveguides. This configuration may help to minimize the footprint of a near-eye display system. It is observed, however, that even a small amount of light of an unexpected wavelength may have undesired consequences when coupled into another pupil-expanding waveguide. Such consequences include 'ghost' images and display-color impurity.

Figure 4:
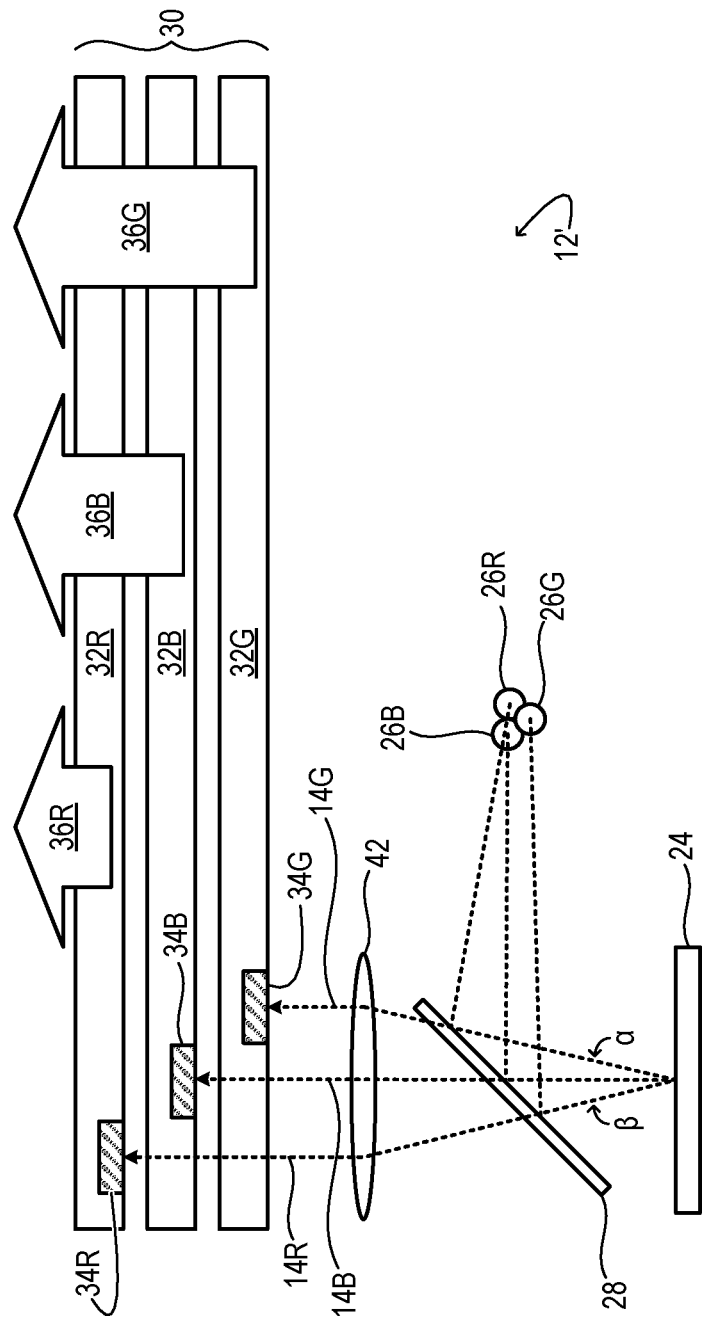
FIG. 4 shows aspects of another example near-eye display system of a head-mounted display.

To address these issues, second entry aperture 34G in FIG. 2 is offset from first entry aperture 34R along the length of second waveguide 32G. Third entry aperture 34B, however, is aligned to the first entry aperture. Entry apertures are 'aligned' if a straight line normal to the stacked waveguides would pass through both entry apertures. Conversely, entry apertures are offset if the entry apertures viewed normal to the waveguides fail to eclipse each other, but are spaced apart (e.g., in the length direction). The configuration illustrated in FIG. 2 provides a compromise between compactness and protection from unwanted optical effects. In particular, red image 14R and blue image 14B enter pupil-expanding portion 30 at the same position. Well separated in wavelength, these component images are unlikely to cross-couple into the opposite waveguides. Green image 14G, having significant overlap with the acceptance bands of the red- and blue-expanding waveguides, enters the pupil-expanding portion offset from the other component images. The green image is therefore spatially excluded from cross-coupling. Despite this advantage, other embodiments are envisaged in which the spatially excluded image component is red or blue. In still other embodiments, the entry apertures of all the waveguides may be offset from each other, as shown in FIG. 4.

In a layered waveguide configuration, a component image 14 may be directed to its intended entry aperture 34 by controlling the angle at which that component emerges from image-forming array 24. Returning again to FIG. 2, first light-emitter 26R may be configured to direct emission onto image-forming array 24 at a first angle α, the second light-emitter may be configured to direct emission onto the image-forming array at a second angle β, and the third light emitter may be configured to direct emission onto the image-forming array at a third angle γ. (In the illustrated embodiment, γ=α.) In this manner, the first, second, and third images are released from the image-forming array at three different angles. Consolidation optic 42 is configured to receive all three component images, to direct first image 14R into the first entry aperture 34R, to direct second image 14G into second entry aperture 34G, and to direct third image 14B into third entry aperture 34B. In the embodiment above, the different angles through which the emission is directed are coplanar, as shown in FIG. 2. In other embodiments, at least one of the different angles may lie in an orthogonal plane, as described further below.

The manner of directing emission onto image-forming array 24 at different angles is not particularly limited. In the embodiment shown in FIG. 5, each light emitter 26 includes a light emitting diode 44, a collection lens 46 optically downstream of the light-emitting diode, and a microlens array 48 optically downstream of the collection lens. The microlens array may be configured to image the emission of the light-emitting diode onto the image-forming array at the desired angle.

FIG. 6 shows aspects of another example near-eye display system 12'. The optical configuration of the embodiment of FIG. 6 differs from that of FIG. 2 or 4 due to the presence of an additional optical fold. The additional optical fold enables the near-eye display system to be implemented more compactly. In particular, FIG. 6 shows a polarizing beamsplitter 28' in the form of two polished glass prisms 50A and S0B. A polarizing beamsplitting (PBS) film 52 is laminated to prism 50A, and the two prisms are then bonded to form a cuboid structure. Near-eye display system 12' also includes an aspheric singlet 54 comprised of molded glass and a birdbath polarizing beamsplitter cube 56. The birdbath polarizing beamsplitter cube includes two polished glass prisms; one prism is coated with a PBS McNeil dielectric coating. This coating reflects S-polarized light and transmits P-polarized light. The prisms are then bonded to form a cuboid structure. The near-eye display also includes a doublet reflector comprising a polished glass lens 58 and a molded glass lens 60 supporting a dielectric reflection. The two lens elements are optically bonded. Finally, the near-eye display includes an eyepiece 62 formed from three polished, optically bonded glass lenses.

Figure 7:
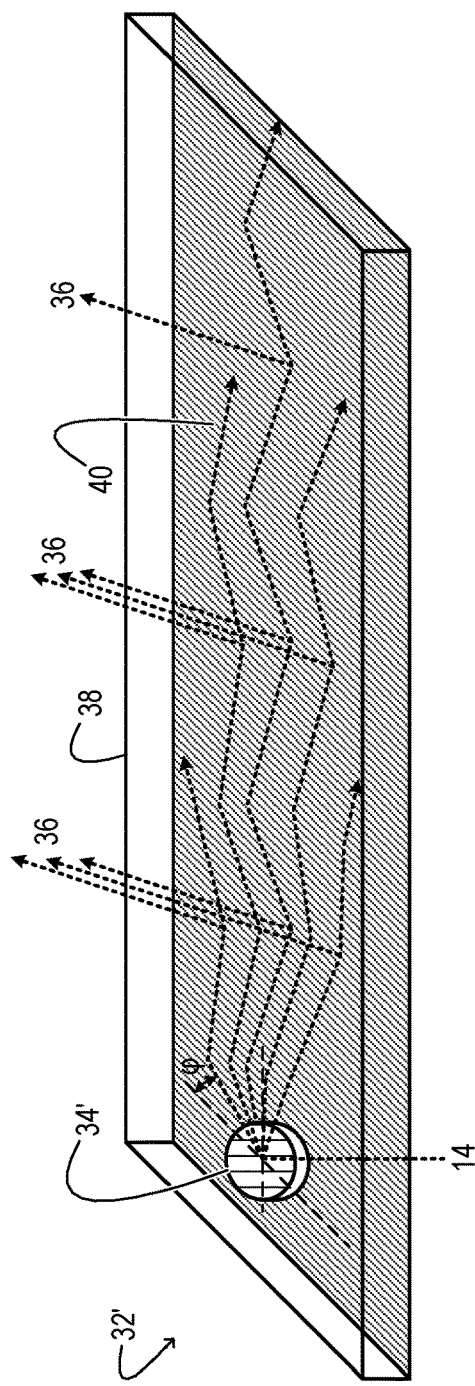
FIG. 7 shows aspects of another example optical waveguide of a near-eye display system.

No aspect of the foregoing drawings or description should be understood in a limiting sense, for numerous variations, extensions, and omissions are contemplated as well. For instance, the pupil expansion solution as described above operates largely in one dimension—typically in the horizontal direction across the user's field of view. For implementations in which vertical pupil expansion is also desired, the above solution may be applied redundantly—i.e., vertical followed by horizontal expansion, or vice versa. Alternatively, any given waveguide 32 of pupil-expanding portion 30 may be configured to expand a component image 14 in two orthogonal directions (i.e., to provide concurrent horizontal and vertical pupil expansion. FIG. 7 illustrates this approach in one, non-limiting example.

In waveguide 32' of FIG. 7, entry aperture 34' is a circular feature arranged on the longitudinal bisector of waveguide medium 38. In one example, the entry aperture may be about 3 millimeters in diameter. Grating or other diffractive features of the entry aperture may be configured such that the interacting entry beam is dispersed over a range of azimuth angles φ within the plane of the waveguide medium, but at a supercritical angle of elevation relative to the plane. Accordingly, the rays of interacting light fan out as they propagate through the waveguide medium. The azimuthal fan out of the interacting beam expands the light in a second (e.g., vertical) direction, orthogonal to the horizontal direction of expansion via frustrated TIR, as described above. Other aspects of waveguide 32' are analogous to those of waveguide 32.

In pupil-expanding portions having waveguides like that of FIG. 7 (where the entry aperture does not extend all the way across the waveguide), the entry apertures of the various stacked waveguides may be offset in either the width direction of the waveguide (e.g., vertically), or in the longitudinal direction (e.g., horizontally), or in both directions. Accordingly, the various angles α, β, γ, through which the emission is directed en route to image-forming array 24 need not be coplanar. As an alternative to the coplanar arrangement shown in FIG. 2, at least one of the different angles may lie in another (e.g., orthogonal) plane.

While the above description relates primarily to pupil expansion of component images of different colors, this aspect is by no means necessary. The layered waveguide approach described above can also be applied to component images of the same color. The motivation in that case may be to direct intense image light through different optical channels, so as to avoid overheating any one channel. Thus, the various component images referenced above may be substantially identical in some implementations.

One aspect of this disclosure is directed to a near-eye display system comprising first and second optical waveguides. The first optical waveguide is configured to receive a first image through a first entry aperture, to expand the first image along the first optical waveguide, and to release an expanded first image. Layered parallel to the first optical waveguide, the second optical waveguide is configured to receive a second image through a second entry aperture, to expand the second image along the second optical waveguide, and to release an expanded second image to overlap the expanded first image, the second entry aperture being offset from the first entry aperture along the second optical waveguide.

In some implementations, each of the first and second entry apertures includes a surface-relief grating. In some implementations, each of the first and second entry apertures includes one or more of a volume hologram and a polarization Bragg grating. In some implementations, the near-eye display system further comprises an exit pupil arranged on the each of the first and second optical waveguides, wherein the exit pupil of first optical waveguide is configured to release the expanded first image, and the exit pupil of the second optical waveguide is configured to release the expanded second image. In some implementations, the second optical waveguide is further configured to transmit the first image through to the first optical waveguide. In some implementations, the near-eye display system further comprises a third optical waveguide layered parallel to the first and second optical waveguides, wherein the third optical waveguide is configured to receive a third image through a third entry aperture, to expand the third image along the third optical waveguide, and to release an expanded third image to overlap the expanded first and second images. In some implementations, the third entry aperture is aligned to the first or second entry aperture. In some implementations, the third entry aperture is offset from both the first and second entry apertures along the third optical waveguide. In some implementations, the first and second entry apertures are offset along a first axis, and the first and third entry apertures are offset along a second axis. In some implementations, the near-eye display system further comprises a reflective image-forming array; a first light emitter configured to direct emission onto the reflective image-forming array at a first angle, to form the first image; a second light emitter configured to direct emission onto the reflective image-forming array at a second angle, to form the second image; and a consolidation optic configured to receive the first and second images, to direct the first image into the first entry aperture, and to direct the second image into the second entry aperture. In some implementations, each of the first and second emitters includes a laser or light-emitting diode.

Another aspect of this disclosure is directed to a near-eye display system comprising first and second optical waveguides. The first optical waveguide is configured to receive a first image of a first color through a first entry aperture, to expand the first image along the first optical waveguide, and to release an expanded first image. Layered parallel to the first optical waveguide, the second optical waveguide is configured to receive a second image of a second color through a second entry aperture, to expand the second image along the second optical waveguide, and to release an expanded second image to overlap the expanded first image, the second entry aperture being offset from the first entry aperture along the second optical waveguide.

In some implementations, the near-eye display system further comprises a third optical waveguide layered parallel to the first and second optical waveguides, wherein the third optical waveguide is configured to receive a third image of a third color through a third entry aperture, to expand the third image along the third optical waveguide, and to release an expanded third image to overlap the expanded first and second images. In some implementations, a median wavelength of the second color lies between a median wavelength of the first color and a median wavelength of the third color, and wherein the third entry aperture is aligned to the first or second entry aperture. In some implementations, the near-eye display system further comprises a reflective image-forming array; a first light emitter configured to direct emission of the first color onto the reflective image-forming array at a first angle, to form the first image; a second light emitter configured to direct emission of the second color onto the reflective image-forming array at a second angle, to form the second image; and a consolidation optic configured to receive the first and second images, to direct the first image into the first entry aperture, and to direct the second image into the second entry aperture.

Another aspect of this disclosure is directed to a near-eye display system comprising first and second optical waveguides, a reflective image-forming array, first and second light emitters, and a consolidation optic. The first optical waveguide is configured to receive a first image through a first entry aperture, to expand the first image along the first optical waveguide, and to release an expanded first image. Layered parallel to the first optical waveguide, the second optical waveguide is configured to receive a second image through a second entry aperture, to expand the second image along the second optical waveguide, and to release an expanded second image to overlap the expanded first image, the second entry aperture being offset from the first entry aperture along the second optical waveguide. The first light-emitter is configured to direct emission onto the reflective image-forming array at a first angle, to form the first image. The second light-emitter is configured to direct emission onto the reflective image-forming array at a second angle, to form the second image. The consolidation optic is configured to receive the first and second images, to direct the first image into the first entry aperture, and to direct the second image into the second entry aperture.

In some implementations, each of the first and second light emitters includes a light emitting diode, a collection lens optically downstream of the light-emitting diode, and a microlens array optically downstream of the collection lens, wherein the microlens array is configured to image the emission of the light-emitting diode onto the reflective image-forming array. In some implementations, the first and second angles are coplanar. In some implementations, the first and second angles lie in different planes. In some implementations, the reflective image-forming array is a liquid-crystal-on-silicon (LCOS) array.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display system comprising:
a first optical waveguide configured to receive a first component image through a first entry aperture, to expand the first component image along the first optical waveguide, and to release an expanded first component image; and
layered parallel to the first optical waveguide, a second optical waveguide configured to receive a second component image through a second entry aperture, to expand the second component image along the second optical waveguide, and to release an expanded second component image to an area overlapping the expanded first component image, such that the first and second component images form a fused display image in a field of view of a wearer of the near-eye display system, the second entry aperture being offset from the first entry aperture along the second optical waveguide.

2. The near-eye display system of claim 1 wherein each of the first and second entry apertures includes a surface-relief grating.

3. The near-eye display system of claim 1 wherein each of the first and second entry apertures includes one or more of a volume hologram and a polarization Bragg grating.

4. The near-eye display system of claim 1 further comprising an exit pupil arranged on the each of the first and second optical waveguides, wherein the exit pupil of first optical waveguide is configured to release the expanded first component image, and the exit pupil of the second optical waveguide is configured to release the expanded second component image.

5. The near-eye display system of claim 1 wherein the second optical waveguide is further configured to transmit the first component image through to the first optical waveguide.

6. The near-eye display system of claim 1 further comprising a third optical waveguide layered parallel to the first and second optical waveguides, wherein the third optical waveguide is configured to receive a third component image through a third entry aperture, to expand the third component image along the third optical waveguide, and to release an expanded third component image to the area.

7. The near-eye display system of claim 6 wherein the third entry aperture is aligned to the first or second entry aperture.

8. The near-eye display system of claim 6 wherein the third entry aperture is offset from both the first and second entry apertures along the third optical waveguide.

9. The near-eye display system of claim 6 wherein the first and second entry apertures are offset along a first axis, and wherein the first and third entry apertures are offset along a second axis.

10. The near-eye display system of claim 1 further comprising:
   a reflective image-forming array;
   a green light emitter configured to direct emission onto the reflective image-forming array at a first angle, to form the first component image;
   a blue light emitter configured to direct emission onto the reflective image-forming array at a second angle, to form the second component image; and
   a consolidation optic configured to receive the first and second component images, to direct the first component image into the first entry aperture, and to direct the second component image into the second entry aperture.

11. The near-eye display system of claim 10 wherein each of the first and second emitters includes a laser or light-emitting diode.

12. A near-eye display system comprising:
   a first optical waveguide configured to receive a first-color component image through a first entry aperture, to expand the first-color component image along the first optical waveguide, and to release an expanded first-color component image; and
   layered parallel to the first optical waveguide, a second optical waveguide configured to receive a second-color component image through a second entry aperture, to expand the second-color component image along the second optical waveguide, and to release an expanded second-color component image to an area overlapping the expanded first-color component image, such that the first- and second-color component images form a fused color display image in a field of view of a wearer of the near-eye display system, the second entry aperture being offset from the first entry aperture along the second optical waveguide.

13. The near-eye display system of claim 12 further comprising a third optical waveguide layered parallel to the first and second optical waveguides, wherein the third optical waveguide is configured to receive a third-color component image through a third entry aperture, to expand the third-color component image along the third optical waveguide, and to release an expanded third-color component image to the area.

14. The near-eye display system of claim 12 wherein a median wavelength of the second-color component image lies between a median wavelength of the first-color component image and a median wavelength of the third-color component image, and wherein the third entry aperture is aligned to the first or second entry aperture.

15. The near-eye display system of claim 12 further comprising:
   a reflective image-forming array;
   a first light emitter configured to direct emission of a first color onto the reflective image-forming array at a first angle, to form the first-color component image;
   a second light emitter configured to direct emission of a second color onto the reflective image-forming array at a second angle, to form the second-color component image; and
   a consolidation optic configured to receive the first- and second-color component images, to direct the first-color component image into the first entry aperture, and to direct the second-color component image into the second entry aperture.

16. A near-eye display system comprising:
   a reflective image-forming array;
   a first light-emitter configured to direct emission onto the reflective image-forming array at a first angle, to form a first component image;
   a second light-emitter configured to direct emission onto the reflective image-forming array at a second angle, to form a second component image;
   a first optical waveguide configured to receive the first component image through a first entry aperture, to expand the first component image along the first optical waveguide, and to release an expanded first component image;
   layered parallel to the first optical waveguide, a second optical waveguide configured to receive a second component image through a second entry aperture, to expand the second component image along the second optical waveguide, and to release an expanded second component image to an area overlapping the expanded first component image, such that the first and second component images form a fused display image in a field of view of a wearer of the near-eye display system, the second entry aperture being offset from the first entry aperture along the second optical waveguide; and
   a consolidation optic configured to receive the first and second component images, to direct the first component image into the first entry aperture, and to direct the second component image into the second entry aperture.

17. The near-eye display system of claim 16 wherein each of the first and second light emitters includes a light emitting diode, a collection lens optically downstream of the light-emitting diode, and a microlens array optically downstream of the collection lens, wherein the microlens array is configured to image the emission of the light-emitting diode onto the reflective image-forming array.

18. The near-eye display system of claim 16 wherein the first and second angles are coplanar.

19. The near-eye display system of claim 16 wherein the first and second angles lie in different planes.

20. The near-eye display system of claim 16 wherein the reflective image-forming array is a liquid-crystal-on-silicon (LCOS) array.

* * * * *